United States Patent
Cho et al.

(10) Patent No.: US 9,023,532 B2
(45) Date of Patent: May 5, 2015

(54) POSITIVE ACTIVE MATERIAL COMPOSITION FOR RECHARGEABLE LITHIUM BATTERY, POSITIVE ELECTRODE FOR RECHARGEABLE LITHIUM BATTERY INCLUDING THE POSITIVE ACTIVE MATERIAL COMPOSITION, AND RECHARGEABLE LITHIUM BATTERY INCLUDING THE POSITIVE ACTIVE MATERIAL COMPOSITION

(71) Applicant: Samsung SDI Co., Ltd., Yongin-si, Gyeonggi-do (KR)

(72) Inventors: Chae-Woong Cho, Yongin-si (KR); Myung-Duk Lim, Yongin-si (KR); Seung-Hun Han, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 103 days.

(21) Appl. No.: 13/770,174

(22) Filed: Feb. 19, 2013

(65) Prior Publication Data
US 2014/0038035 A1 Feb. 6, 2014

(30) Foreign Application Priority Data
Aug. 1, 2012 (KR) .................. 10-2012-0084558

(51) Int. Cl.
| | |
|---|---|
| *H01M 4/13* | (2010.01) |
| *H01M 4/58* | (2010.01) |
| *H01M 4/131* | (2010.01) |
| *H01M 4/62* | (2006.01) |
| *H01M 4/48* | (2010.01) |
| *H01M 10/052* | (2010.01) |

(52) U.S. Cl.
CPC .............. *H01M 4/131* (2013.01); *H01M 4/622* (2013.01); *H01M 4/13* (2013.01); *H01M 4/483* (2013.01); *H01M 4/621* (2013.01); *H01M 4/623* (2013.01); *H01M 4/625* (2013.01); *H01M 10/052* (2013.01); *Y02E 60/122* (2013.01)

(58) Field of Classification Search
USPC .................. 429/188, 211, 223, 231.5, 231.95
See application file for complete search history.

(56) References Cited

U.S. PATENT DOCUMENTS

| | | | |
|---|---|---|---|
| 6,753,111 B2 | 6/2004 | Kweon et al. | |
| 6,919,143 B2 | 7/2005 | Hwang et al. | |
| 7,507,501 B2 | 3/2009 | Kweon et al. | |
| 7,655,358 B2 | 2/2010 | Kweon et al. | |
| 2004/0265689 A1 | 12/2004 | Ochi et al. | |
| 2006/0127773 A1 | 6/2006 | Kawakami | |
| 2008/0090149 A1* | 4/2008 | Sano et al. | .................... 429/220 |

(Continued)

FOREIGN PATENT DOCUMENTS

| | | |
|---|---|---|
| JP | 2001-023697 A | 1/2001 |
| JP | 2001-093582 A | 4/2001 |

(Continued)

*Primary Examiner* — Stewart Fraser
(74) *Attorney, Agent, or Firm* — Robert E. Bushnell, Esq.

(57) ABSTRACT

A positive active material composition for a rechargeable lithium battery that includes a positive active composite material including a compound being reversibly capable of intercalating and deintercalating lithium, $WO_3$, and a binder; and an aqueous binder, a positive electrode for a rechargeable lithium battery including the positive active material composition, and a rechargeable lithium battery comprising the positive electrode including the positive active material composition.

16 Claims, 9 Drawing Sheets

(56) References Cited

U.S. PATENT DOCUMENTS

| | | |
|---|---|---|
| 2011/0111290 A1 | 5/2011 | Uchida et al. |
| 2012/0115030 A1* | 5/2012 | Tanaka et al. ............... 429/211 |
| 2013/0101900 A1* | 4/2013 | Nagai ........................ 429/223 |
| 2013/0177812 A1* | 7/2013 | Han et al. ................. 429/231.5 |

FOREIGN PATENT DOCUMENTS

| | | |
|---|---|---|
| JP | 2004-296395 A | 10/2004 |
| JP | 4114247 B2 | 4/2008 |
| JP | 2010-021075 A | 1/2010 |

* cited by examiner

POSITIVE ACTIVE MATERIAL COMPOSITION FOR RECHARGEABLE LITHIUM BATTERY, POSITIVE ELECTRODE FOR RECHARGEABLE LITHIUM BATTERY INCLUDING THE POSITIVE ACTIVE MATERIAL COMPOSITION, AND RECHARGEABLE LITHIUM BATTERY INCLUDING THE POSITIVE ACTIVE MATERIAL COMPOSITION

CLAIM OF PRIORITY

This application makes reference to, incorporates the same herein, and claims all benefits accruing under 35 U.S.C. §119 from an application for POSITIVE ACTIVE MATERIAL COMPOSITION FOR RECHARGEABLE LITHIUM BATTERY AND RECHARGEABLE LITHIUM BATTERY INCLUDING SAME earlier filed in the Korean Intellectual Property Office on 1 Aug. 2012 and there duly assigned Serial No. 10-2012-0084558.

BACKGROUND OF THE INVENTION

1. Field of the Invention

This disclosure relates to a positive active material composition for a rechargeable lithium battery, a positive electrode for a rechargeable lithium battery including the positive active material composition, and a rechargeable lithium battery including the positive active material composition.

2. Description of the Related Art

In recent times, due to reductions in size and weight of portable electronic equipments, there has been a need to develop batteries for portable electronic equipments having both high performance and large capacity.

Rechargeable lithium batteries include a negative electrode, a positive electrode, and an electrolyte and generate electrical energy through oxidation and reduction reactions when lithium ions are intercalated/deintercalated in the positive and negative electrodes.

Such rechargeable lithium batteries use a lithium metal, a carbon-based material, Si, and the like as a negative active material.

As for a positive active material for the rechargeable lithium batteries, a metal chalcogenide compound being capable of intercalating and deintercalating lithium ions, for example, a composite metal oxide such as $LiCoO_2$, $LiMn_2O_4$, $LiNiO_2$, $LiNi_{1-x}Co_xO_2$ (0<x<1), $LiMnO_2$, and the like has been used.

SUMMARY OF THE INVENTION

One or more embodiments of the present invention may provide a positive active material composition for a rechargeable lithium battery preventing internal resistance increase and having improved high-rate and cycle-life characteristics.

One or more embodiments of the present invention may provide a positive electrode for a rechargeable lithium battery including the positive active material composition.

One or more embodiments of the present invention may provides a rechargeable lithium battery including the positive active material composition.

According to one embodiment of the present invention, provided is a positive active material composition for a rechargeable lithium battery that includes a positive active composite material including a compound being reversibly capable of intercalating and deintercalating lithium, $WO_3$, and a binder; and an aqueous binder.

The $WO_3$ may be included in an amount of about 0.1 wt % to about 5 wt % and specifically, about 0.1 wt % to about 1 wt % based on 100 wt % of the compound being reversibly capable of intercalating and deintercalating lithium.

The binder included in the positive active composite material may be an organic binder, and the organic binder may be suitable. The binder may be polyvinylidene fluoride.

The aqueous binder may include a fluorine-based acrylate, a polyethylene-based acrylate, a polypropylene-based acrylate, polytetrafluoroethylene, a styrene-butadiene rubber, an acrylated styrene-butadiene rubber, polyvinylalcohol, sodium polyacrylate, a copolymer of propylene and a $C_2$ to $C_8$ olefin, a copolymer of (meth)acrylic acid and (meth)acrylic acid alkyl ester, or a combination thereof.

According to another embodiment of the present invention, provided is a positive electrode for a rechargeable lithium battery that includes a current collector and a positive active material layer disposed on the current collector, and including the positive active material composition. The current collector may be Al.

According to yet another embodiment of the present invention, provided is a rechargeable lithium battery that includes a positive electrode including the positive active material composition; a negative electrode including a negative active material; and an electrolyte including a non-aqueous organic solvent and a lithium salt.

The positive active material composition may suppress increase of internal resistance caused by corrosion of a current collector and thus, may provide a battery having improved high-rate and cycle-life characteristics.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components wherein.

DETAILED DESCRIPTION OF THE INVENTION

Hereinafter, the present invention will be described more fully with reference to the accompanying drawings. Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

A positive active material composition for a rechargeable lithium battery according to one embodiment of the present invention may includes a positive active composite material including a compound being reversibly capable of intercalating and deintercalating lithium (hereinafter, referred to be as an "intercalation compound"), $WO_3$, and a binder; and an aqueous binder.

The $WO_3$ may be included in an amount of about 0.1 wt % to about 5 wt %, and specifically about 0.1 wt % to about 1 wt % based on 100 wt % of the intercalation compound. When the $WO_3$ is used out of the range, this positive active material composition may decrease active mass density of a positive electrode, deteriorate battery capacity, or the like. In the specification, an active mass denotes an active material layer formed on a current collector, that is, an active material layer formed of an active material, a binder, and optionally, a conductive material.

The positive active material composition according to the present invention may be usefully applied to a positive electrode for a rechargeable lithium battery and particularly, a positive electrode using an aqueous binder.

However, a conventional rechargeable lithium battery using an aqueous binder may have a problem of increasing internal resistance. The reasons are explained as follows. A positive active material slurry including a positive active material, an aqueous binder, a conductive material, and a solvent may have strong base (about pH 11-about pH 14) due to pH increased by $Li^+$ and $OH^-$ generated from $LiCO_3$, LiOH, and the like that may remain due to non-reaction during preparation of a positive active material. When the positive active material slurry having strong base is coated on an Al current collector, the positive active material slurry may corrode the Al current collector due to high pH and generate $H_2$ gas and thus, form many pin holes in a positive electrode and increase internal resistance of the positive electrode.

On the other hand, a positive active material composition slurry according to one embodiment of the present invention may includes a positive active composite material including a intercalation compound, $WO_3$ and a binder; an aqueous binder; a conductive material, and a solvent. $WO_3$ in the positive active material composition slurry plays a role of an oxidant and thus, absorbs $OH^-$ and decreases the amount of the $OH^-$ in the positive active material composition slurry, and decreases pH. As a result, the $WO_3$ may suppress positive active material composition from corroding a current collector. In particular, the anti-corrosion effects against a current collector may not be accomplished by other metal oxides such as $TiO_2$, $CeO_2$, $SnO_2$, and $Al_2O_3$ but the $WO_3$.

In addition, the corrosion suppression of the $WO_3$ against a current collector may be effectively accomplished by closely adhering the intercalation compound with the $WO_3$ through a binder to form a positive active composite material. If the intercalation compound is simply and physically mixed with the $WO_3$ in a positive active material layer, the $WO_3$ may hardly suppress the corrosion of a current collector. Accordingly, a dispersing agent and the like may be additionally used to mix the intercalation compound with the $WO_3$ but the dispersing agent and the like may relatively decrease the amount of intercalation in a positive electrode and thus, deteriorate capacity. In addition, since the $WO_3$ needs to be first dispersed and then, mixed with the intercalation compound, it may take longer time to manufacture a positive active material composition due to the additional process, deteriorating productivity.

However, when the $WO_3$ as a part of the positive active composite material is included in the positive electrode for a rechargeable lithium battery according to one embodiment of the present invention, high electric characteristics may be accomplished.

The binder, that is, a binder included in a positive active composite material is used to form a composite by closely bonding the compound being reversibly capable of intercalating and deintercalating lithium with the $WO_3$ and may include an organic binder.

In addition, the organic binder is not dissolved in water and used as a solvent to make the positive active composite material in order to fabricate a positive electrode for a rechargeable lithium battery and thus, may appropriately maintain the positive active composite material structure.

Examples of the organic binder may include polyvinylidene fluoride, polytetrafluoroethylene, or a combination thereof.

The binder may be included in an amount of about 0.05 wt % to about 0.5 wt % based on 100 wt % of the compound being reversibly capable of intercalating and deintercalating lithium. When the binder is included within the range, a positive active composite material may be better formed without deteriorating capacity.

The positive active composite material may further include a conductive material.

When the positive active composite material includes the conductive material, another conductive material may not be additionally used during the fabrication of a positive active material composition slurry for a positive electrode for a rechargeable lithium battery. The conductive material improves electrical conductivity of a positive electrode. Any electrically conductive material can be used as a conductive material unless it causes a chemical change. Examples of the conductive material may include a carbon-based material such as natural graphite, artificial graphite, carbon black, acetylene black, ketjen black, a carbon fiber, and the like; a metal-based material of a metal powder or a metal fiber made of copper, nickel, aluminum, silver, and the like; a conductive polymer such as a polyphenylene derivative, and the like; or a mixture thereof.

The aqueous binder improves binding properties of the positive active material composition particles to each other and to a current collector. The aqueous binder may include fluorine-based acrylate, polyethylene-based acrylate, polypropylene-based acrylate, polytetrafluoroethylene, a styrene-butadiene rubber, an acrylated styrene-butadiene rubber, polyvinylalcohol, sodium polyacrylate, a copolymer of propylene and $C_2$ to $C_8$ olefin, a copolymer of (meth)acrylic acid and (meth)acrylic acid alkyl ester, or a combination thereof.

The positive active material composition may further include a cellulose-based compound as a thickener to impart viscosity. The cellulose-based compound may include one or more of carboxylmethyl cellulose, hydroxypropylmethyl cellulose, methyl cellulose, or an alkali metal salt thereof. The alkali metal may be Na, K, or Li. The cellulose-based compound as a thickener may be included in an amount of about 0.1 parts to about 2 parts by weight based on 100 parts by weight of the positive active material.

The compound being reversibly capable of intercalating and deintercalating lithium (i.e. intercalation compound) may be any compound that may be used as a positive active material for a rechargeable lithium battery. The intercalation compound may include a composite oxide including at least one selected from cobalt, manganese, and nickel, as well as lithium.

In particular, the following lithium-containing compounds as intercalation compound may be used; $Li_aA_{1-b}X_bD_2$ ($0.90 \leq a \leq 1.8$, $0 \leq b \leq 0.5$); $Li_aA_{1-b}X_bO_{2-c}D_c$ ($0.90 \leq a \leq 1.8$, $0 \leq b \leq 0.5$, $0 \leq c \leq 0.05$); $Li_aE_{1-b}X_bO_{2-c}D_c$ ($0.90 \leq a \leq 1.8$, $0 \leq b \leq 0.5$, $0 \leq c \leq 0.05$); $Li_aE_{2-b}X_bO_{4-c}D_c$ ($0.90 \leq a \leq 1.8$, $0 \leq b \leq 0.5$, $0 \leq c \leq 0.05$); $Li_aNi_{1-b-c}Co_bX_cD_\alpha$ ($0.90 \leq a \leq 1.8$, $0 \leq b \leq 0.5$, $0 \leq c \leq 0.5$, $0 \leq \alpha \leq 2$); $Li_aNi_{1-b-c}Co_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Co_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cD_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_\alpha$ ($0.90 \leq a \leq 1.8$, $0 \leq b \leq 0.5$, $0 \leq c \leq 0.05$, $0 \leq \alpha \leq 2$); $Li_aNi_{1-b-c}Mn_bX_cO_{2-\alpha}T_2$ ($0.90 \leq a \leq 1.8$, $0 \leq b \leq 0.5$, $0 \leq c \leq 0.05$, $0 \leq \alpha \leq 2$); $Li_aNi_bE_cG_dO_2$ ($0.90 \leq a \leq 1.8$, $0 \leq b \leq 0.9$, $0 \leq c \leq 0.5$, $0.001 \leq d \leq 0.1$); $Li_aNi_bCo_cMn_dG_eO_2$ ($0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ ($0.90 \leq a \leq 1.8$, $0.001 \leq b \leq 0.1$) $Li_aCo_{1-b}G_bO_2$ ($0.90 \leq a \leq 1.8$, $0 \leq b \leq 0.1$); $Li_aMn_{1-b}G_bO_2$ ($0.90 \leq a \leq 1.8$, $0 \leq b \leq 0.1$); $Li_aMn_{2-b}G_bO_4$ ($0.90 \leq a \leq 1.8$, $0 \leq b \leq 0.1$); $Li_aCoG_bO_2$ ($0.90 \leq a \leq 1.8$, $0.001 \leq b \leq 0.1$); $Li_aMn_{1-b}G_bO_2$ ($0.90 \leq a \leq 1.8$, $0.001 \leq b \leq 0.1$); $Li_aMnG_bO_4$ ($0.90 \leq a \leq 1.8$, $0.001 \leq b \leq 0.1$); $Li_aMn_{1-g}G_gPO_4$ ($0.90 \leq a \leq 1.8$, $0 \leq g \leq 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); or $Li_aFePO_4$ ($0.90 \leq a \leq 1.8$).

In the above chemical formulae, A is selected from Ni, Co, Mn, and a combination thereof, but is not limited thereto; X is selected from Al, Ni, Co, Mn, Cr, Fe, Mg, Sr, V, a rare earth element, and a combination thereof, but is not limited thereto; D is selected from O, F, S, P, and a combination thereof, but is not limited thereto; E is selected from Co, Mn, and a combination thereof, but is not limited thereto; T is selected from F, S, P, and a combination thereof, but is not limited thereto; G is selected from Al, Cr, Mn, Fe, Mg, La, Ce, Sr, V, and a combination thereof, but is not limited thereto; Q is selected from Ti, Mo, Mn, and a combination thereof, but is not limited thereto; Z is selected from Cr, V, Fe, Sc, Y, and a combination thereof, but is not limited thereto; and J is selected from V, Cr, Mn, Co, Ni, Cu, and a combination thereof, but is not limited thereto.

The intercalation compound may have a coating layer on the surface, or may be mixed with a compound having a coating layer. The coating layer may include at least one coating-element-containing compound selected from the group consisting of a coating-element-containing oxide, a coating-element-containing hydroxide, a coating-element-containing oxyhydroxide, a coating-element-containing oxycarbonate, and a coating-element-containing hydroxylcarbonate, and combinations thereof. The coating-element-containing compounds for a coating layer may be amorphous or crystalline. The coating element for a coating layer may include Mg, Al, Co, K, Na, Ca, Si, Ti, V, Sn, Ge, Ga, B, As, Zr, or a mixture thereof.

The coating layer may be formed by a method having no negative influence on properties of a positive active material composition by including these coating elements in the intercalation compound. For example, the method may include any coating method such as spray coating, dipping, and the like, which is not illustrated in more detail, since it is well-known to those who work in the related field.

In the positive active material composition according to one embodiment of the present invention, a positive active material may be prepared as follows.

First, an intercalation compound, $WO_3$, and a binder are mixed. Herein, the mixing may be an agglomeration process. The agglomeration process may be performed by putting the intercalation compound, $WO_3$, and the binder in an agglomeration equipment and rotating the assembly equipment at a speed of about 5000 rpm to about 20,000 rpm for about 3 minutes to about 15 minutes. During the mixing, a conductive material may be further added thereto.

According to the agglomeration process, a composite material of the intercalation compound, $WO_3$, and the binder, optionally the conductive material may be formed. If a heat-treatment is performed after the mixing, it may be not economical, and also it may deteriorate capacity.

According to another embodiment of the present invention, provided is a positive electrode for a rechargeable lithium battery that includes a current collector, and a positive active material layer disposed on the current collector and including the positive active material composition. The current collector may be Al. According to the embodiment of the present invention, the positive electrode for a rechargeable lithium battery may have no corrosion problem, even though a positive active material layer including an aqueous binder is formed on an Al current collector. The reason is that the $WO_3$ included in a positive active composite material plays a role of an oxidant and thus, suppresses corrosion of the Al current collector, and prevents internal resistance increase in the positive electrode.

In the positive active material layer, the positive active composite material may be included in an amount of about 95 wt % to about 99 wt % based on the total weight of the positive active material layer. The aqueous binder may be included in an amount of about 1 wt % to about 5 wt % based on the total weight of the positive active material layer.

The positive electrode for a rechargeable lithium battery may be fabricated by a method including mixing the positive active composite material, a conductive material, and an aqueous binder in a solvent to prepare a positive active material composition slurry, and coating the positive active material composition slurry on a current collector. The solvent may be water. In this way, the positive electrode is fabricated using water instead of an organic solvent such as very toxic N-methylpyrrolidone to prepare the positive active material composition slurry and thus, the method is not toxic to a human body and decreases a cost. In addition, this positive electrode may suppress internal resistance increase of a rechargeable lithium battery and bring excellent high-rate and cycle-life characteristics.

Another embodiment of the present invention provides a rechargeable lithium battery including the positive electrode; a negative electrode including a negative active material; and an electrolyte.

The negative electrode includes a current collector and a negative active material layer disposed on the current collector, and the negative active material layer includes a negative active material.

The negative active material may include a material that reversibly intercalates/deintercalates lithium ions, lithium metal, a lithium metal alloy, a material being capable of doping/dedoping lithium, transition metal oxide, or a combination thereof.

The material that reversibly intercalates/deintercalates lithium ions may be a carbon material. The carbon material may be any generally-used carbon-based negative active material in a lithium ion rechargeable battery. Examples of the carbon material may include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonized product, fired coke, and the like.

Examples of the lithium metal alloy may include lithium and a metal selected from the group consisting of Na, K, Rb, Cs, Fr, Be, Mg, Ca, Sr, Si, Sb, Pb, In, Zn, Ba, Ra, Ge, Al, Sn, and combinations thereof.

Examples of the material being capable of doping/dedoping lithium may include Si, Si—C composite, $SiO_x$ (0<x<2), a Si-Q alloy (wherein Q is an element selected from the group consisting of an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from the group consisting of an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. The elements, Q and R may be selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and a combination thereof.

The transition metal oxide may be vanadium oxide, lithium vanadium oxide, lithium titanium oxide, and combinations thereof.

In the negative active material layer, the negative active material may be included in an amount of about 95 wt % to about 99 wt % based on the total weight of the negative active material layer.

The negative active material layer may include a binder, and optionally a conductive material. In the negative active material layer, the binder may be included in an amount of about 1 wt % to about 5 wt % based on total weight of the negative active material layer. When the negative active material layer includes a conductive material, the negative active material layer may include about 90 wt % to about 98 wt % of the negative active material, about 1 wt % to about 5 wt % of the binder, and about 1 wt % to about 5 wt % of the conductive material based on the total weight of the negative active material layer.

The binder improves binding properties of negative active material particles with one another and with a current collector. The binder may be a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may include a styrene-butadiene rubber, an acrylated styrene-butadiene rubber, polyvinyl alcohol, sodium polyacrylate, a copolymer of propylene and a $C_2$ to $C_8$ olefin, a copolymer of (meth)acrylic acid and (meth)acrylic acid alkyl ester, or a combination thereof.

When the water-soluble binder is used in the negative active material layer of a negative electrode as a negative electrode binder, a cellulose-based compound may be further used to provide viscosity as a thickener. The cellulose-based compound may include one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to about 3 parts by weight based on 100 parts by weight of the negative active material.

The conductive material is included to improve electrode conductivity. Any electrically conductive material may be used as a conductive material unless it causes a chemical change. Examples of the conductive material may include a carbon-based material such as natural graphite, artificial graphite, carbon black, acetylene black, ketjen black, a carbon fiber, and the like; a metal-based material of metal powder or metal fiber including copper, nickel, aluminum, silver, and the like; conductive polymers such as polyphenylene derivatives; or a mixture thereof.

The current collector may be selected from a copper foil, a nickel foil, a stainless steel foil, a titanium foil, a nickel foam, a copper foam, a polymer substrate coated with a conductive metal, and a combination thereof.

The electrolyte may include a non-aqueous organic solvent and a lithium salt.

The non-aqueous organic solvent serves as a medium of transmitting ions taking part in the electrochemical reaction of the rechargeable lithium battery.

The non-aqueous organic solvent may include a carbonate-based solvent, an ester-based solvent, an ether-based solvent, a ketone-based solvent, an alcohol-based solvent, or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like, and the ketone-based solvent may include cyclohexanone and the like. The alcohol-based solvent may include ethyl alcohol, isopropyl alcohol, and the like, and examples of the aprotic solvent may include nitriles such as R—CN (where R is a $C_2$ to $C_{20}$ linear, branched, or cyclic hydrocarbon that may include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the non-aqueous organic solvent is used in a mixture, the mixture ratio can be controlled in accordance with a desirable battery performance.

The carbonate-based solvent may include a mixture with a cyclic carbonate and a linear carbonate. The cyclic carbonate and the linear carbonate are mixed together in a volume ratio of about 1:1 to about 1:9. When the mixture of the cyclic carbonate and the linear carbonate is used as an electrolyte, rechargeable lithium batteries may have enhanced performance.

In addition, the non-aqueous organic electrolyte may further include an aromatic hydrocarbon-based solvent along with the carbonate-based solvent. The carbonate-based solvents and the aromatic hydrocarbon-based solvents may be mixed together in a volume ratio of about 1:1 to about 30:1.

The aromatic hydrocarbon-based solvent may be represented by the following Chemical Formula 1.

Chemical Formula 1

In Chemical Formula 1, $R_1$ to $R_6$ may be the same or different and may be selected from hydrogen, a halogen, a $C_1$ to $C_{10}$ alkyl group, a haloalkyl group, and a combination thereof.

The aromatic hydrocarbon-based solvent may include one selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate or an ethylene carbonate-based compound represented by the following Chemical Formula 2 to improve cycle life.

Chemical Formula 2

In Chemical Formula 2, $R_7$ and $R_8$ may be independently hydrogen, a halogen, a cyano (CN) group, a nitro ($NO_2$) group, or a $C_1$ to $C_5$ fluoroalkyl group, provided that at least one of $R_7$ and $R_8$ is a halogen, a nitro ($NO_2$) group, or a $C_1$ to $C_5$ fluoroalkyl group, and $R_7$ and $R_8$ are not simultaneously hydrogen.

The ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive in the electrolyte for improving cycle life may be flexibly used within an appropriate range.

The lithium salt is dissolved in an organic solvent, supplies a with lithium ions, basically operates the rechargeable lithium battery, and improves transportation of the lithium ions between the positive and the negative electrodes. The lithium salt may include at least one supporting salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato) borate; LiBOB). The lithium salt may be used in a concentration ranging from about 0.1 M to about 2.0 M. When the lithium salt is included at the above concentration range, an electrolyte may have optimal electrolyte conductivity and viscosity, and may thus have enhanced performance and effective lithium ion mobility.

The rechargeable lithium battery may further include a separator between the negative electrode and the positive electrode, as needed. The separator may be a single layer or multi-layers. Examples of a suitable separator material for a single layer may include polyethylene, polypropylene, polyvinylidene fluoride. On the other hand, a multi-layered separator may be a polyethylene/polypropylene double-layered separator, a polyethylene/polypropylene/polyethylene triple-layered separator, and a polypropylene/polyethylene/polypropylene triple-layered separator.

The following examples illustrate the present invention in more detail. These examples, however, are not in any sense to be interpreted as limiting the scope of the present invention.

Example 1

A positive active composite material was prepared by mixing $LiFePO_4$, a carbon black conductive material, $WO_3$, and a polyvinylidene fluoride binder in an agglomeration method. Herein, the $LiFePO_4$, carbon black, $WO_3$, and the polyvinylidene fluoride binder were mixed in a weight ratio of 90:5:1:4.

The agglomeration method was performed by putting the $LiFePO_4$, carbon black, $WO_3$, and the polyvinylidene fluoride binder in an agglomeration equipment and rotating the agglomeration equipment at a speed of 10,000 rpm for 5 minutes.

Figure 1:
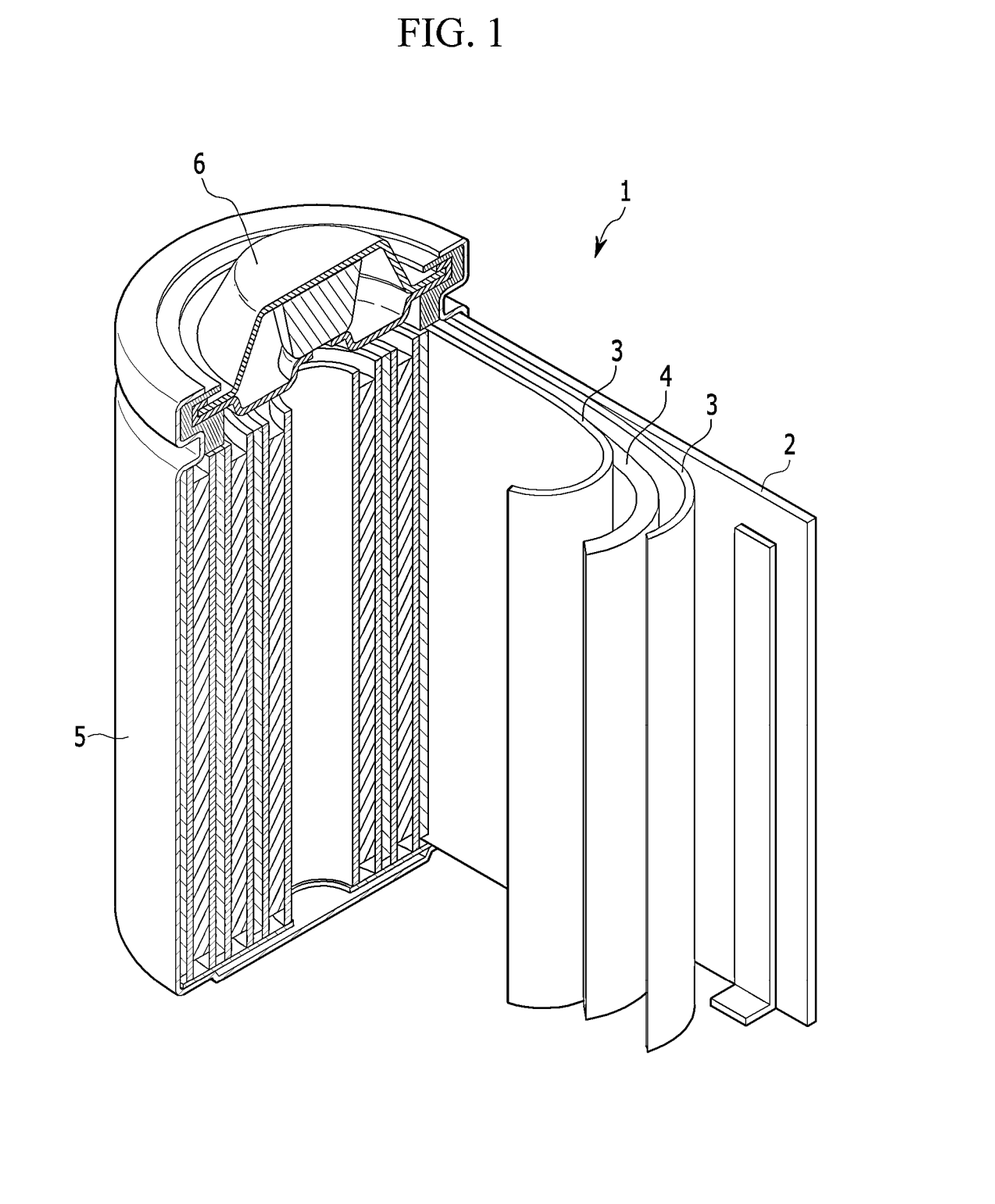
FIG. 1 is a schematic view showing the structure of a rechargeable lithium battery according to one embodiment of the present invention.
Figure 2A:
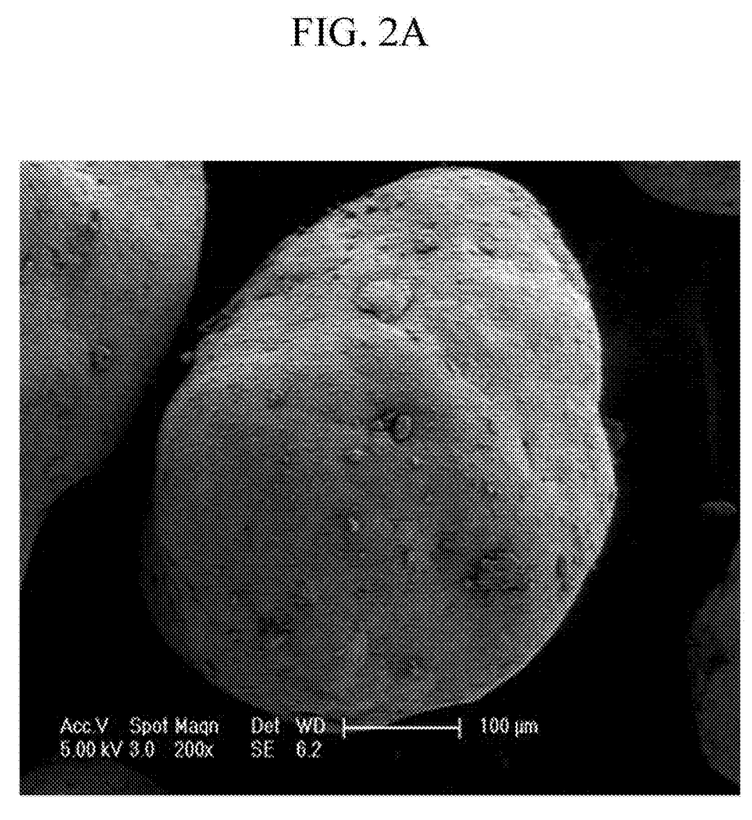
FIG. 2A is a Scanning Electron Microscope (SEM) photograph of a positive active composite material of Example 1 at 200× magnification according to one embodiment of the present invention.
Figure 2B:
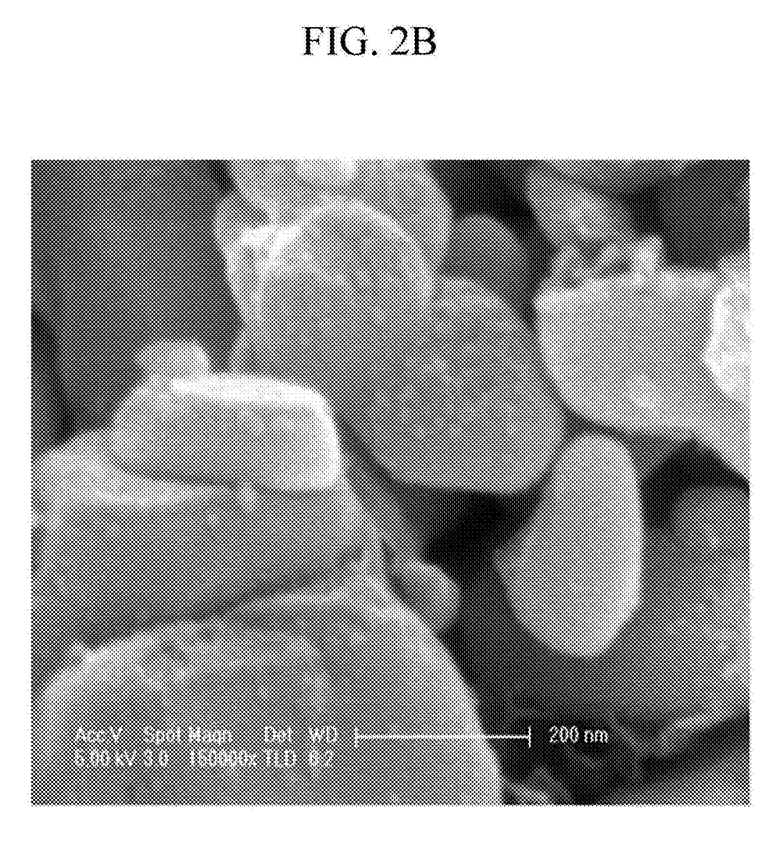
FIG. 2B is a Scanning Electron Microscope (SEM) photograph of a positive active composite material of Example 1 at 1500× magnification according to one embodiment of the present invention.

Scanning Electron Microscope (SEM) photographs of the positive active composite material were taken at 200× magnification and 15000× magnification. The results are provided in FIGS. 2A and 2B, respectively. As shown in FIGS. 2A and 2B, the positive active composite material had self-assembled particles with sizes in hundreds of micrometers range.

The positive active composite material was mixed with a carboxylmethyl cellulose thickener and a fluorine-based acrylate aqueous binder (SX-8584-13, JSR micro Inc.) in a weight ratio of 96:1.5:2.5 in a water solvent, preparing a positive active material composition slurry.

Comparative Example 1

Positive active material slurry was prepared by mixing $LiFePO_4$, a carbon black conductive material, a carboxylmethyl cellulose thickener, and a fluorine-based acrylate aqueous binder (SX-8584-13, JSR micro Inc.) in a weight ratio of 90:5:1.5:3.5 in a water solvent.

Example 2

The positive active material composition slurry according to Example 1 was coated on an Al foil and then, drying and compressing it, fabricating a positive electrode having a positive active material layer on an Al current collector.

Comparative Example 2

A positive electrode having a positive active material layer on an Al current collector was fabricated by coating the positive active material slurry according to Comparative Example 1 on an Al foil and then, drying and compressing it.

Figure 3:
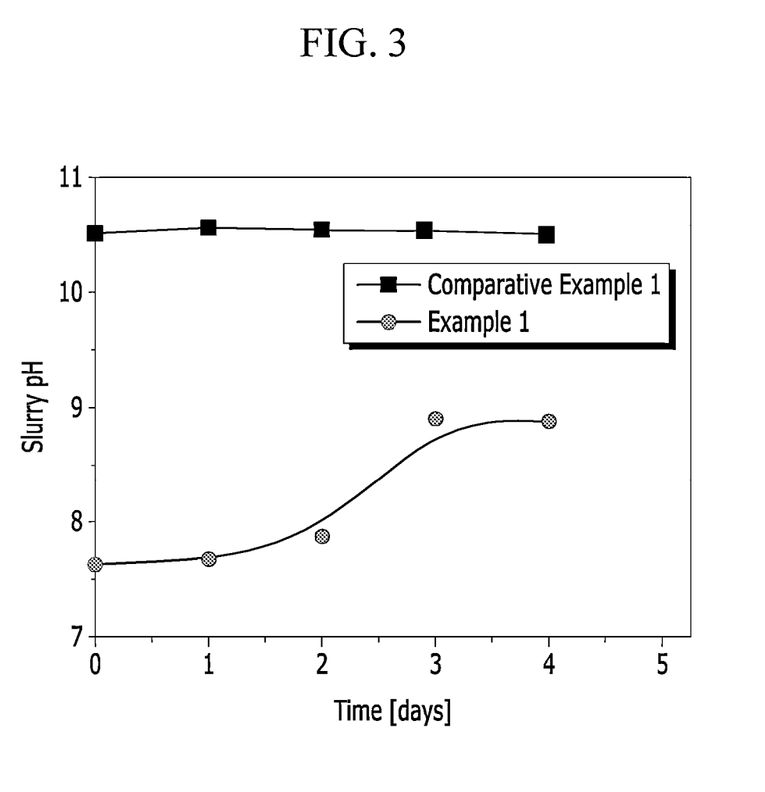
FIG. 3 is a graph showing pH measurement results of a positive active material composition slurry of Example 1 and a positive active material slurry of Comparative Example 1 depending on storage time according to one embodiment of the present invention.

The positive active material composition slurry according to Example 1 and the positive active material slurry according to Comparative Example 1 were measured regarding pH depending on time. The results are provided in FIG. 3. As shown in FIG. 3, the positive active material slurry according to Comparative Example 1 had very high pH of about 10.5 for 2 days. As a result, the positive active material slurry according to Comparative Example 1 might corrode the current collector due to high pH.

On the contrary, the positive active material composition slurry according to Example 1 had pH of about 7.5 for 2 days, and still had a little lower pH of 9 when stored for 4 days compared to the positive active material slurry according to Comparative Example 1. Accordingly, the positive active material composition slurry according to Example 1 might not cause a problem of corroding the current collector, which is clearly shown based on the following surface photograph of the positive electrode.

Figure 4A:
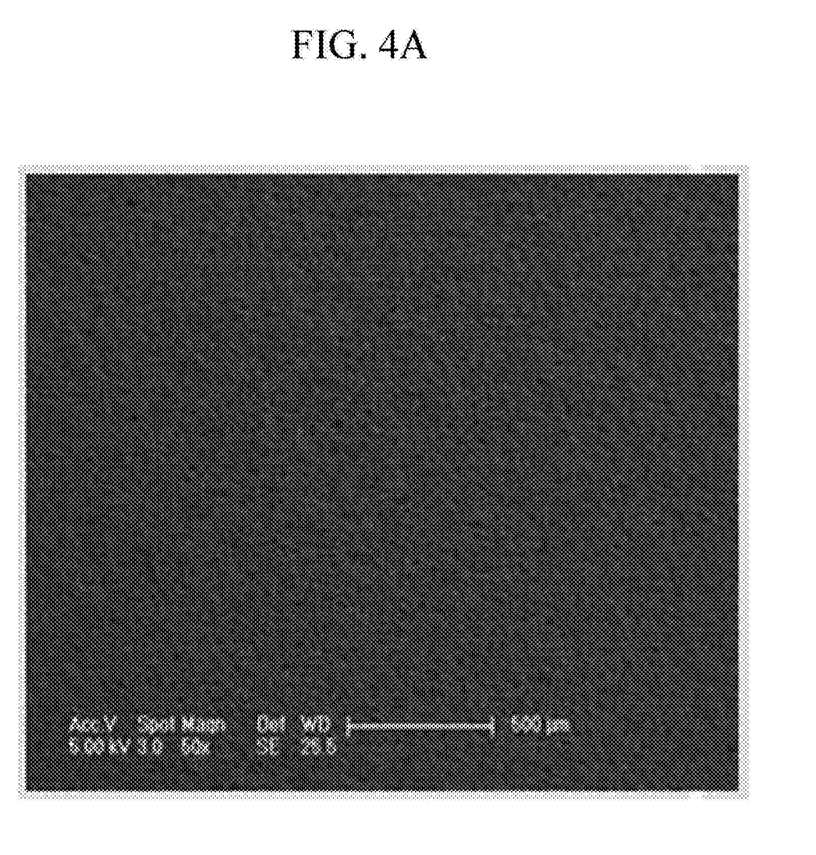
FIGS. 4A, 4B, and 4C are Scanning Electron Microscope (SEM) photographs showing surfaces of a positive electrode of Example 2 depending on time that allowed to stand according to one embodiment of the present invention.
Figure 4B:
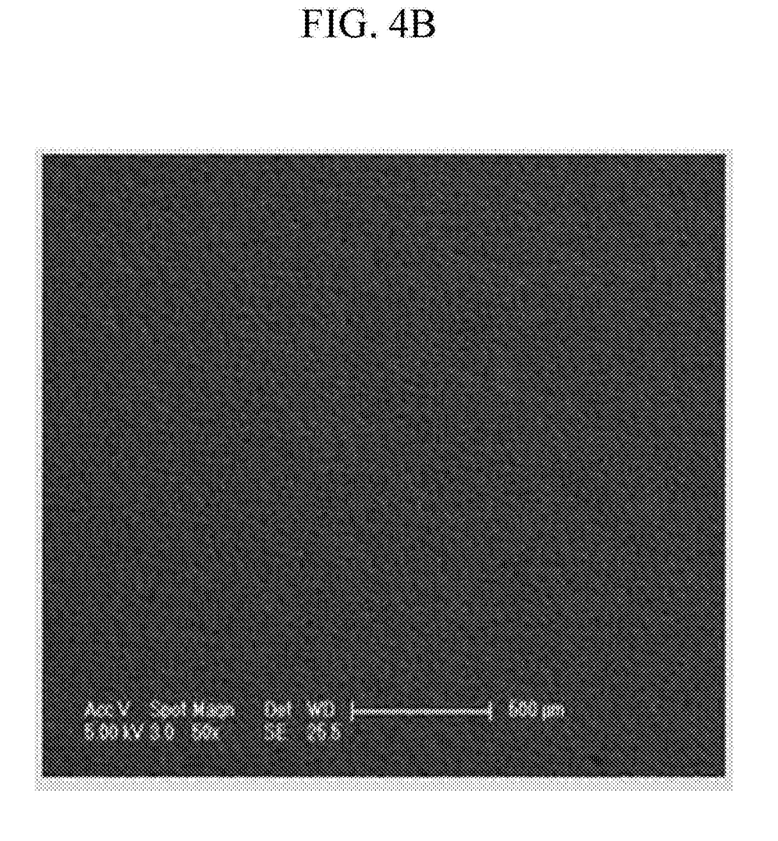
Figure 4C:
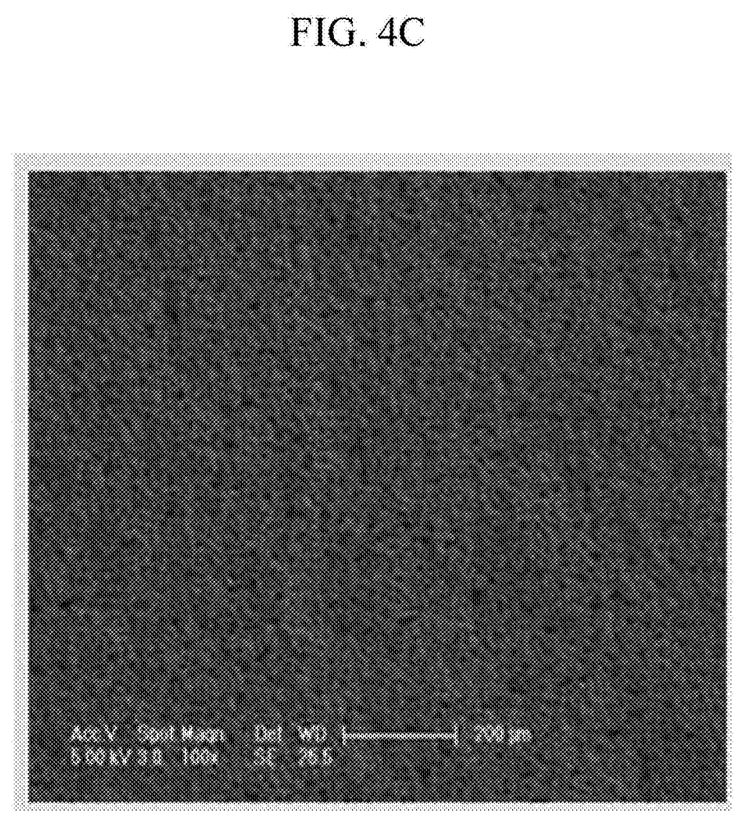
Figure 5:
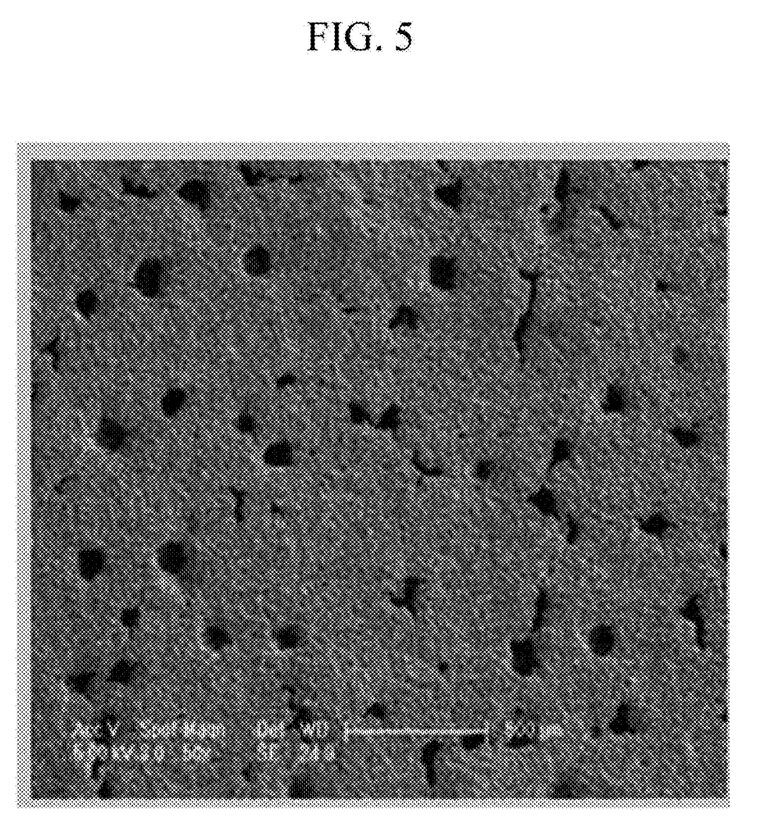
FIG. 5 is a Scanning Electron Microscope (SEM) photograph showing surface of a positive electrode of Comparative Example 2 according to one embodiment of the present invention.

The photographs of the surface of the positive active material composition layer of the positive electrodes right after fabricated according to Example 2 and Comparative Example 2 are provided in FIG. 4A (Example 2) and FIG. 5 (Comparative Example 2). In addition, FIG. 4B provides the surface photograph of the positive electrode according to Example 2 after allowed to stand for one day, and FIG. 4C provides the surface photograph of the positive electrode according to Example 2 after allowed to stand for four days. As shown in FIGS. 4A, 4B, and 4C, the positive electrode according to Example 2 had no pin hole on the surface. In other words, the positive electrode according to Example 2 had a uniform surface after allowed to stand for 4 days as well as immediately. On the contrary, the positive electrode according to Comparative Example 2 had many pin holes on the surface right after fabricated as shown in FIG. 5. As a result, the positive electrode according to Comparative Example 2 generated $H_2$ gas during the fabrication process, while the positive electrode according to Example 2 generated no $H_2$ gas during the fabrication process.

Example 3

A negative active material slurry was prepared by mixing a graphite negative active material, a carbon black conductive material, a carboxylmethyl cellulose thickener, and a styrene-butadiene rubber binder in a weight ratio of 96:2:1:1 in a water solvent. The negative active material slurry was coated on a Cu foil and then, dried and compress, fabricating a negative electrode.

The negative electrode, the positive electrode according to Example 2, and an electrolyte solution were used to fabricate a coin-type rechargeable lithium battery cell in a common method. Herein, the electrolyte solution was prepared by mixing ethylene carbonate and diethylcarbonate in a volume ratio of 1:1 to prepare an organic solvent and dissolving 1M of a lithium salt ($LiPF_6$).

Comparative Example 3

A coin-type rechargeable lithium battery cell was fabricated according to the same method as Example 3 except for using the positive electrode according to Comparative Example 2.

Figure 6:
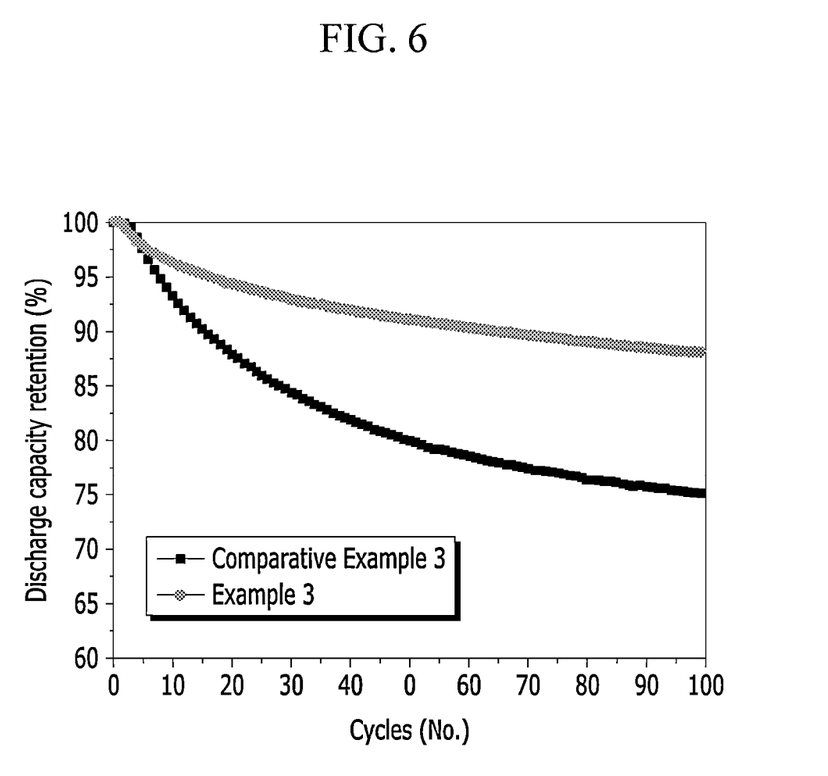
FIG. 6 is a graph showing discharge capacity retentions of rechargeable lithium batteries of Example 3 and Comparative Example 3 according to one embodiment of the present invention.

The coin-type rechargeable lithium battery cells according to Example 3 and Comparative Example 3 were 50 times charged and discharged at 1 C and measured regarding discharge capacity. The discharge capacity was used to calculate discharge capacity retention. The result is provided in FIG. 6. As shown in FIG. 6, the coin-type rechargeable lithium battery cell according to Example 3 had excellent discharge capacity retention compared with the one according to Comparative Example 3.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A positive active material composition for a rechargeable lithium battery, comprising:
    a positive active composite material comprising a compound being reversibly capable of intercalating and deintercalating lithium; $WO_3$; and a binder; and
    an aqueous binder, wherein
    the compound being reversibly capable of intercalating and deintercalating lithium are $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_\alpha$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤α≤2); $Li_aNi_{1-b-c}CO_bX_cO_{2-\alpha}$ (0.90≤a≤1.8, 0≤b≤0.5, 0≤c≤0.05, 0≤a≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0≤a≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1) $Li_aCo_{1-b}G_bO_2$ (0.90≤a≤1.8, 0≤b≤0.1); $Li_aMn_{1-b}G_bO_2$ (0.90≤a≤1.8, 0≤b≤0.1); $Li_aMn_{2-b}G_bO_4$ (0.90≤a≤1.8, 0≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMnG_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); or $Li_{(3-f)}Fe_2(PO_4)_3$ (0≤f≤2); wherein A is selected from Ni, Co, Mn, and a combination thereof; X is selected from Al, Cr, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof; and
    the positive active composite material is prepared by putting the compound being reversibly capable of intercalating and deintercalating lithium, $WO_3$ and the binder in agglomeration equipment and rotating the equipment at a speed of about 5000 rpm to about 20,000 rpm for 3 minutes to about 15 minutes.

2. The positive active material composition for a rechargeable lithium battery of claim 1, wherein the binder is an organic binder.

3. The positive active material composition for a rechargeable lithium battery of claim 1, wherein the compound being reversibly capable of intercalating and deintercalating lithium is included in an amount of about 95 wt % to about 99 wt % based on the total weight of the positive active material composition.

4. The positive active material composition for a rechargeable lithium battery of claim 1, wherein the aqueous binder is included in an amount of about 1 wt % to about 5 wt % based on the total weight of the positive active material composition.

5. The positive active material composition for a rechargeable lithium battery of claim 1, wherein the $WO_3$ is included in an amount of about 0.1 wt % to about 5 wt % based on 100 wt % of the compound being reversibly capable of intercalating and deintercalating lithium.

6. The positive active material composition for a rechargeable lithium battery of claim 1, wherein the $WO_3$ is included in an amount of about 0.1 wt % to about 1 wt % based on 100 wt % of the compound being reversibly capable of intercalating and deintercalating lithium.

7. The positive active material composition for a rechargeable lithium battery of claim 1, wherein the binder is polyvinylidene fluoride.

8. The positive active material composition for a rechargeable lithium battery of claim 1, wherein the aqueous binder comprises at least one selected from the group consisting of a fluorine-based acrylate, a polyethylene-based acrylate, a polypropylene-based acrylate, polytetrafluoroethylene, a styrene-butadiene rubber, an acrylated styrene-butadiene rubber, polyvinylalcohol, sodium polyacrylate, a copolymer of propylene and $C_2$ to $C_8$ olefin, a copolymer of (meth)acrylic acid and (meth)acrylic acid alkyl ester, and combinations thereof.

9. The positive active material composition for a rechargeable lithium battery of claim 1, wherein the positive active composite material further comprises a conductive material.

10. The positive active material composition for a rechargeable lithium battery of claim 9, wherein the conductive material comprises at least one selected from the group consisting of natural graphite, artificial graphite, carbon black, acetylene black, ketjen black, a carbon fiber, a metal powder or a metal fiber made of copper, nickel, aluminum, silver, and the like; a polyphenylene derivative, and mixtures thereof.

11. The positive active material composition for a rechargeable lithium battery of claim 1, wherein the positive active material composition further comprises a thickener.

12. The positive active material composition for a rechargeable lithium battery of claim 11, wherein the thickener comprises at least one selected from the group consisting of carboxylmethyl cellulose, hydroxypropylmethyl cellulose, methyl cellulose, an alkali metal salt, and combinations thereof.

13. The positive active material composition for a rechargeable lithium battery of claim 11, wherein the thickener is included in an amount of about 0.1 parts to about 2 parts by weight based on 100 parts by weight of the positive active composite material.

14. A positive electrode for a rechargeable lithium battery, comprising:
a current collector; and
a positive active material layer disposed on the current collector, and comprising the positive active material composition according to claim 1.

15. The positive electrode for a rechargeable lithium battery of claim 14, wherein the current collector is Al.

16. A rechargeable lithium battery, comprising
a positive electrode comprising the positive active material composition according to claim 1;
a negative electrode comprising a negative active material; and
an electrolyte comprising a non-aqueous organic solvent and a lithium salt.

* * * * *